United States Patent
Khajah et al.

(10) Patent No.: US 12,378,144 B1
(45) Date of Patent: Aug. 5, 2025

(54) WETLAND SYSTEM FOR TREATMENT OF WASTEWATER BRINE

(71) Applicant: KUWAIT INSTITUTE FOR SCIENTIFIC RESEARCH, Safat (KW)

(72) Inventors: Mishari Mohammad Khajah, Safat (KW); Mohd Elmuntasir Ebrahim Ahmed, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 19/043,971

(22) Filed: Feb. 3, 2025

(51) Int. Cl.
*C02F 3/32* (2023.01)
*C02F 3/04* (2023.01)
*C02F 3/06* (2023.01)
*C02F 3/00* (2023.01)

(52) U.S. Cl.
CPC ............... *C02F 3/327* (2013.01); *C02F 3/06* (2013.01); *C02F 2003/003* (2013.01); *C02F 3/04* (2013.01); *C02F 2307/00* (2013.01)

(58) Field of Classification Search
CPC .... C02F 3/327; C02F 3/06; C02F 3/04; C02F 2003/003; C02F 2307/00
USPC ....... 210/602, 614, 616, 617, 903, 906, 908, 210/909, 912, 913, 914
See application file for complete search history.

(56) References Cited

U.S. PATENT DOCUMENTS

| 2006/0124540 A1* | 6/2006 | Austin | ...................... C02F 3/06 |
| | | | 210/605 |
| 2020/0055740 A1* | 2/2020 | Chai | ....................... C02F 1/001 |
| 2024/0101455 A1* | 3/2024 | Skorobogatov | ......... C02F 3/327 |

FOREIGN PATENT DOCUMENTS

| CN | 204918170 U | | 12/2015 | |
| CN | 207313254 U | | 5/2018 | |
| CN | 110078299 A | * | 8/2019 | ............... C02F 9/00 |
| CN | 110451654 A | * | 11/2019 | |
| KR | 20120051624 A | * | 5/2022 | |
| WO | WO-2019114747 A1 | * | 6/2019 | .............. C02F 1/281 |

OTHER PUBLICATIONS

Machine-generated English translation of WO 2019/114747, generated Apr. 14, 2025.*
Machine-generated English translation of KR 2012-0051624, generated Apr. 14, 2025.*

(Continued)

*Primary Examiner* — Fred Prince
(74) *Attorney, Agent, or Firm* — Nath, Goldberg & Meyer; Joshua B. Goldberg

(57) ABSTRACT

A wetland system for treatment of wastewater comprises first and second vertical constructed wetlands connected in series, the first and second vertical constructed wetlands each including a bottom drainage layer, a main filter layer above the drainage layer, and a distribution layer above the main filter layer comprising a plant, wherein the bottom drainage layer of both the first and second vertical constructed wetlands comprises gravel, the distribution layer of both the first and second vertical constructed wetlands comprises agricultural sand, and the main filter layer of the first and second vertical constructed wetlands comprises a bio-plastic media.

14 Claims, 6 Drawing Sheets

(56) References Cited

OTHER PUBLICATIONS

Machine-generated English translation of CN 110451654, generated Apr. 14, 2025.*

Machine-generated English translation of CN 110078299, generated on Jun. 18, 2025.*

Abdelhakeem, et al., "Performance of a vertical subsurface flow constructed wetland under different operational conditions", Journal of Advanced Research, vol. 7, Issue 5, Sep. 2016, 803-814.

Tatoulis, et al., "A novel horizontal subsurface flow constructed wetland: Reducing area requirements and clogging risk", Chemosphere, vol. 186, Nov. 2017, pp. 257-268. Abstract Attached.

* cited by examiner

WETLAND SYSTEM FOR TREATMENT OF WASTEWATER BRINE

BACKGROUND

1. Field

The present disclosure relates to a wastewater treatment system and, particularly, to a wastewater treatment system including a plurality of vertical constructed wetlands.

2. Description of the Related Art

A constructed wetland is an artificial wetland to treat wastewater using the natural functions of vegetation, soil, and/or organisms to provide secondary treatment to wastewater. Similar to natural wetlands, constructed wetlands can remove a range of pollutants, such as suspended solids, organic matter and nutrients (nitrogen and phosphorus). All types of pathogens (i.e., bacteria, viruses, protozoans and helminths) are expected to be removed to some extent in a constructed wetland. Subsurface wetlands provide greater pathogen removal than surface wetlands.

SUMMARY

The present subject matter is directed towards a wetland system for treatment of wastewater. According to an embodiment, the system can treat reverse osmosis (RO) reject wastewater (brine wastewater). In an embodiment, the system includes two vertical constructed wetlands (CW) connected in series. Each vertical constructed wetland includes a bottom drainage layer, a main filter layer above the drainage layer, and a distribution layer above the main filter layer in which a plant is grown. In an embodiment, the system includes a first vertical constructed wetland (CW) and a second vertical constructed wetland (CW) connected in series. In an embodiment, the main filter layer of the first CW and the second CW in the system includes plastic media. In an embodiment, the bottom drainage layer of the first CW and the second CW comprises gravel and the distribution layer of the first CW and the second CW comprises sand and/or agricultural sand, the plant comprises *Sesuvium*, and a granular activated carbon biofilter is connected in series to the second CW.

According to an embodiment, a wetland system for treatment of wastewater comprises first and second vertical constructed wetlands connected in series, the first and second vertical constructed wetlands each including a bottom drainage layer, a main filter layer above the drainage layer, and a distribution layer above the main filter layer comprising a plant, wherein the bottom drainage layer of both the first and second vertical constructed wetlands comprises gravel, the distribution layer of both the first and second vertical constructed wetlands comprises agricultural sand, and the main filter layer of the first and second vertical constructed wetlands comprises a bio-plastic media.

According to an embodiment, a wetland system for treatment of wastewater, comprises first and second vertical constructed wetlands connected in series, the first and second vertical constructed wetlands each including a bottom drainage layer, a main filter layer above the drainage layer, and a distribution layer above the main filter layer comprising a plant, wherein the bottom drainage layer of both the first and second vertical constructed wetlands comprises gravel, the distribution layer of both the first and second vertical constructed wetlands comprises agricultural sand, and the main filter layer of the first and second vertical constructed wetlands comprise a bio-plastic media.

As set forth herein, the plastic in the main layer can minimize the possibility of clogging in the wetland system, thereby reducing pumping and energy requirements, as well as improving effluent quality. In addition to improved operation compared to conventional wastewater systems, the wetland system is more efficient in terms of construction, operation, and maintenance. These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF EMBODIMENTS

The following detailed description is merely exemplary in nature and is not intended to limit the described embodiments or the application and uses of the described embodiments. Any implementation described herein with the words "exemplary" or "illustrative" is not necessarily construed as preferred or advantageous over other implementations. All of the implementations described below are exemplary implementations provided to enable persons skilled in the art to make or use the embodiments of the disclosure and are not intended to limit the scope of the disclosure, which is defined by the claims.

For the purposes of the description herein, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the concepts defined in the appended claims. Hence, specific dimensions and other physical characteristics relating to the embodiments disclosed therein are not to be considered as limiting, unless the claims expressly state otherwise.

In one embodiment, the present subject matter relates to a wetland system for treatment of wastewater. For example, the system can be used to treat brine wastewater, domestic wastewater, industrial wastewater, and grey water. According to an embodiment, the system can treat reverse osmosis (RO) reject wastewater (brine wastewater) to remove heavy metals, total organic contaminants, and other contaminants from the wastewater.

Figure 1:
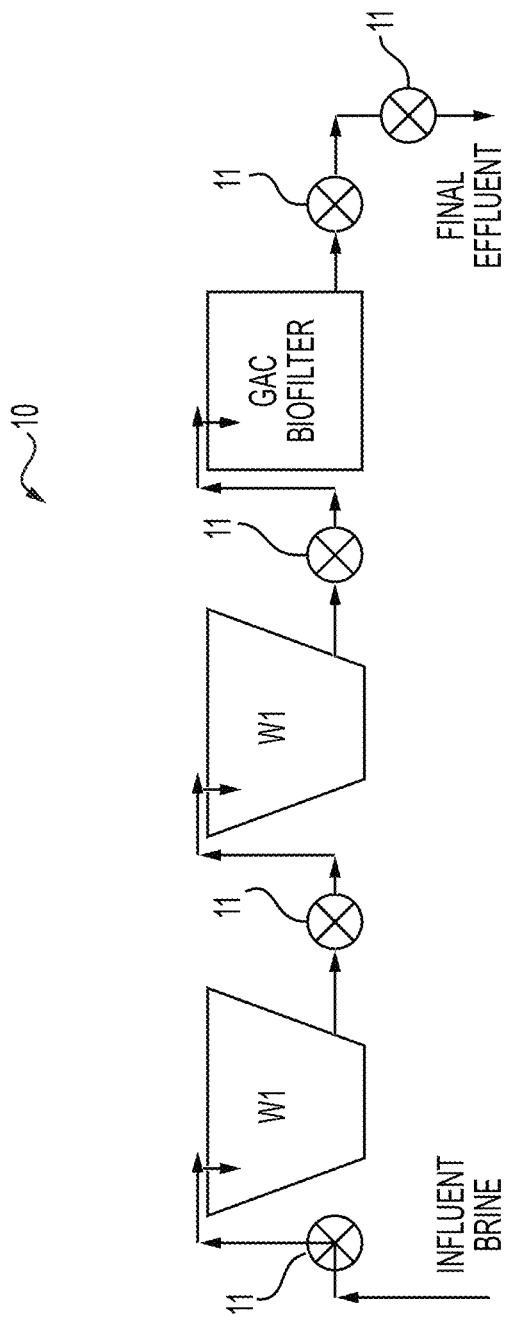
FIG. 1 is a schematic diagram showing an embodiment of the wetland treatment system for treatment of wastewater.
Figure 3:
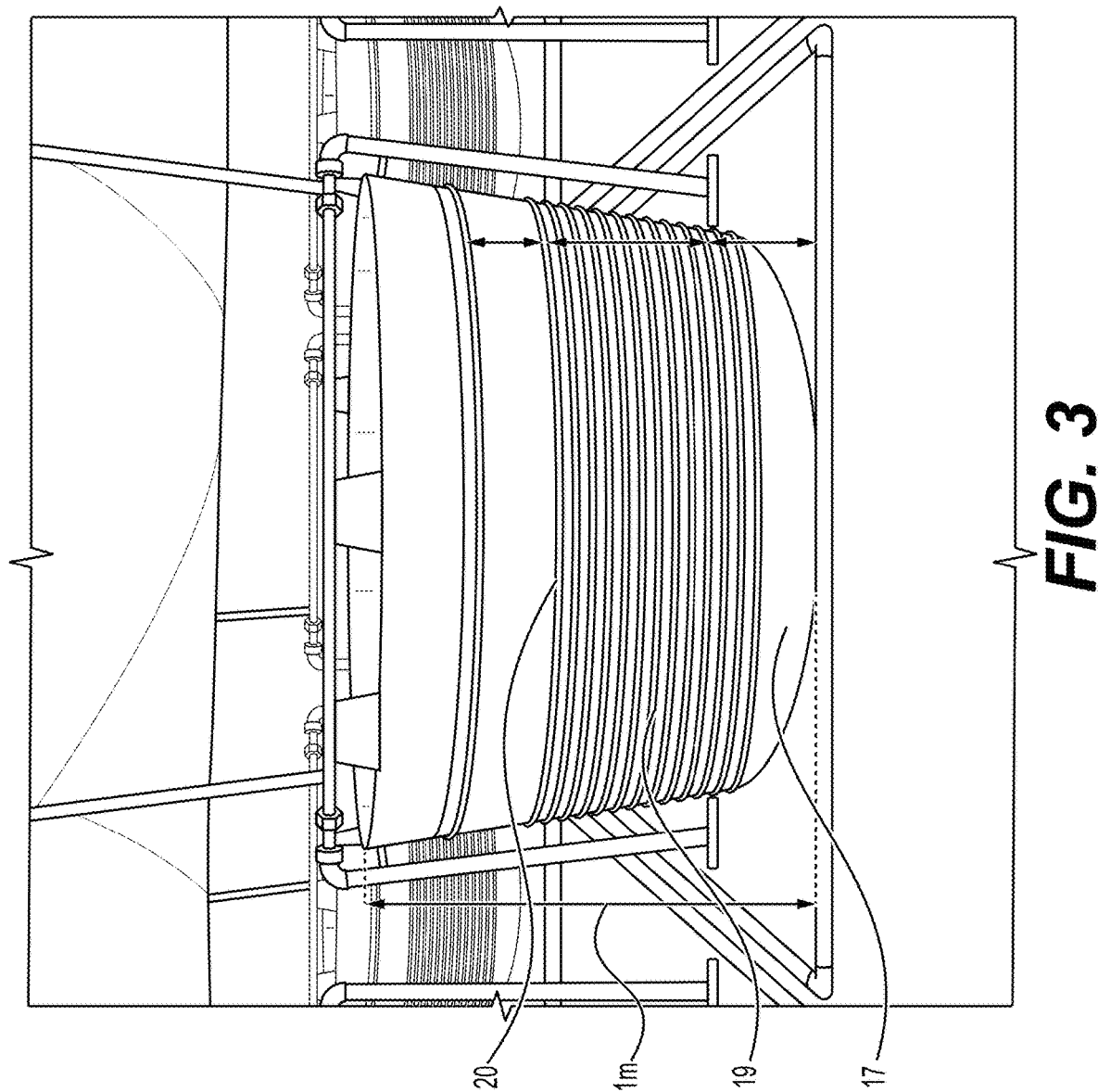
FIG. 3 shows an embodiment of a vertical flow constructed wetland (CW) according to the present teachings.

As shown in FIG. 1, the system, designated 10 in the drawings, includes two vertical constructed wetlands (W1, W2) connected in series. Each vertical constructed wetland includes a bottom drainage layer 17, a main filter layer 19 above the drainage layer, and a distribution layer 20 above the main filter layer 19 in which a plant can be grown (FIG. 3). In an embodiment, the bottom drainage layer comprises gravel and the distribution layer comprises agricultural sand alone, or agricultural sand in combination with traditional sand. In one embodiment, the distribution layer comprises a plant. In an embodiment, the plant grown in the distribution layer comprises *Sesuvium*. Each CW can be generally cylindrical.

Figure 4:
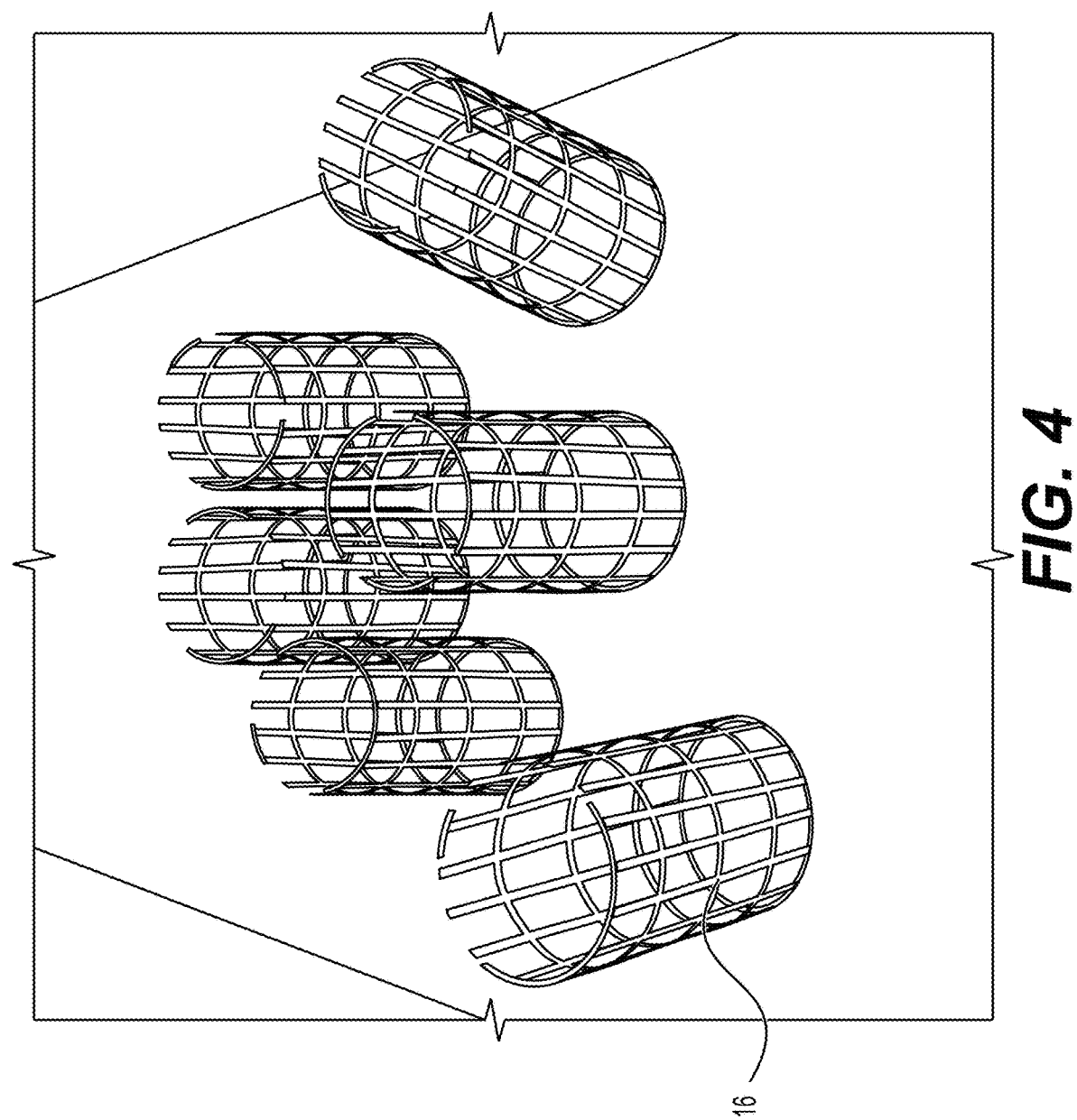
FIG. 4 shows an embodiment of bio-plastic media used in embodiments of the present teachings.

According to an embodiment, the main filter layer of the first two vertical constructed wetlands incudes a bio-plastic media 16, as shown in FIG. 4. As used herein, the phrase "bio-plastic media" refers to plastics that are biodegradable and made of natural materials. Preferably the bio-plastic media has a high surface area, such as bio-plastic media used as packing material. Both plants and bacteria can grow on a surface of the bio-plastic media. Introducing the bio-plastic media into the system can reduce clogging of the constructed wetland system. This, in turn, leads to maximizing contact time between the reverse osmosis reject wastewater and the microbial community attached on the surface of the plastic media leading to improved effluent quality and lower energy requirements.

In an embodiment, the system includes a granular activated carbon (GAC) biofilter connected in series to one of the vertical constructed wetlands, as shown in FIG. 1.

In an embodiment, the wastewater treatment system includes first and second vertical flow constructed wetlands (CWs) and a granular activated carbon (GAC) biofilter 18 connected in series. The system 10 can include a plurality of pumps for moving the wastewater through the various stages of the wastewater treatment system. For example, a pump 11 can feed the wastewater for treatment into the system and one pump 11 can be disposed after each vertical constructed wetland (CW) and after the granular activated carbon (GAC) biofilter. In an exemplary embodiment, as shown in FIG. 3, each CW is about 1 meter in height with a surface area of about 1.2 m$^2$, and includes a drainage layer 17 with a gravel height of about 25 cm, a main filter layer 19 with a height of about 50 cm., and a distribution layer 20 having a first layer including traditional sand at a height of about 5 cm and a second layer including agricultural sand at a height of about 5 cm. As used herein, "agricultural sand" refers to soil mixed with organic fertilizers. As known in the art, agricultural sand is characterized by having grains with sharp edges and different sized grains that will not fill voids in the soil. As used herein, "sand" or "traditional sand" refers to waterborne sand, e.g., beach sand or river sand. Traditional sand has smaller grains that harden quickly and fill the voids.

In an embodiment, a first portion of the gravel in the drainage layer can be about 5 cm in height with a gravel size ranging from about 8 mm to about 16 mm and a second portion of the gravel in the drainage layer can be about 20 cm in height with a gravel size ranging from about 2 mm to about 5 mm. In an embodiment, a first portion of the distribution layer can comprise agricultural sand at a height of about 5 cm and a second portion of the distribution layer can comprise sand at a height of about 5 cm with a sand size ranging from about 0.3 mm to about 0.6 mm.

Figure 5:
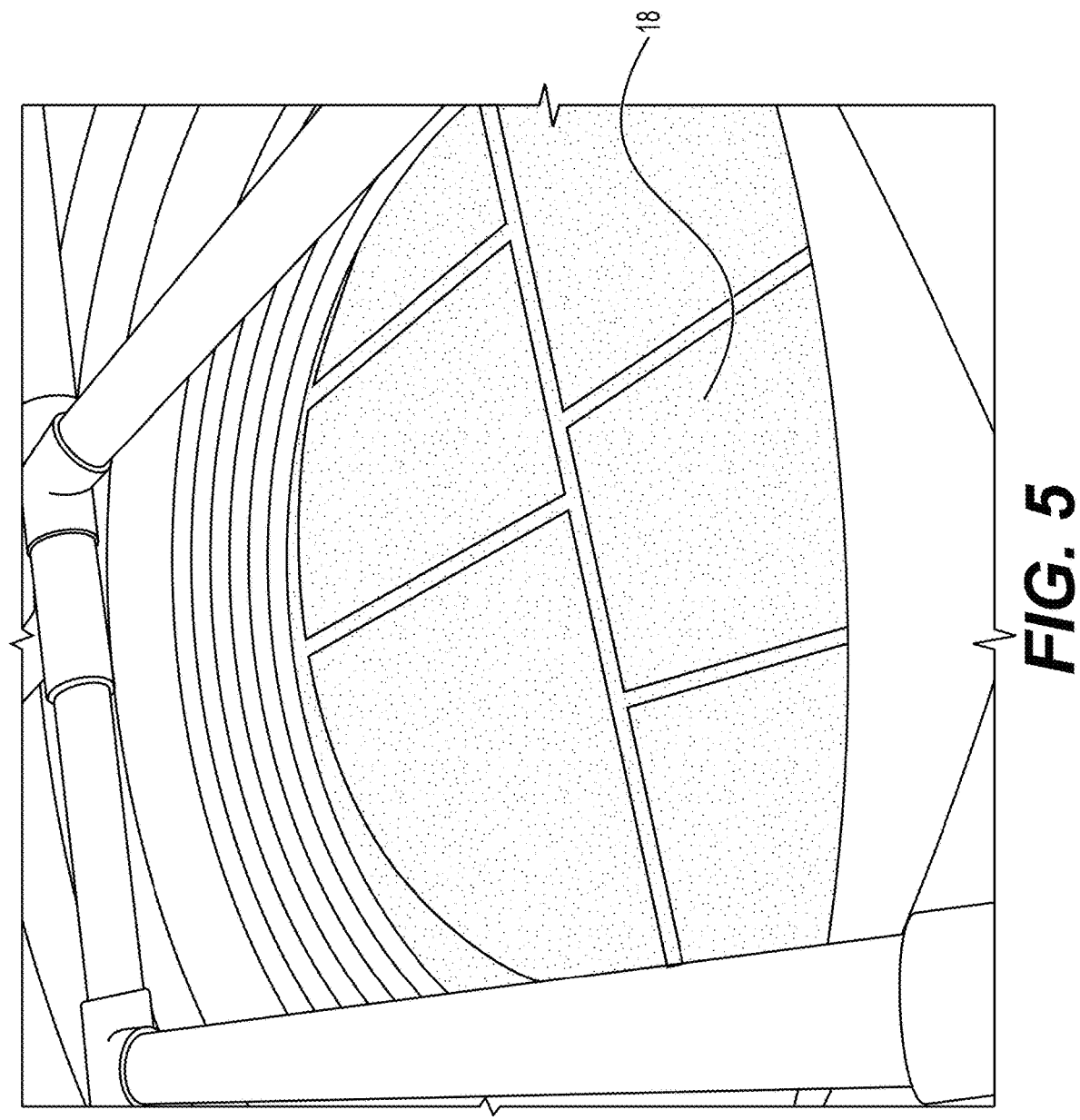
FIG. 5 the granular activated carbon (GAC) biofilter used in embodiments of the present teachings.

In an embodiment, the GAC biofilter 18 (FIG. 5) can have a height of about 50 cm and a thickness of about 2.5 mm. The GAC biofilter in the system can further remove the treated wastewater after treatment by the CWs. For example, the GAC biofilter can remove metals, nitrogen compounds, and trace organics from the wastewater.

Figure 6:
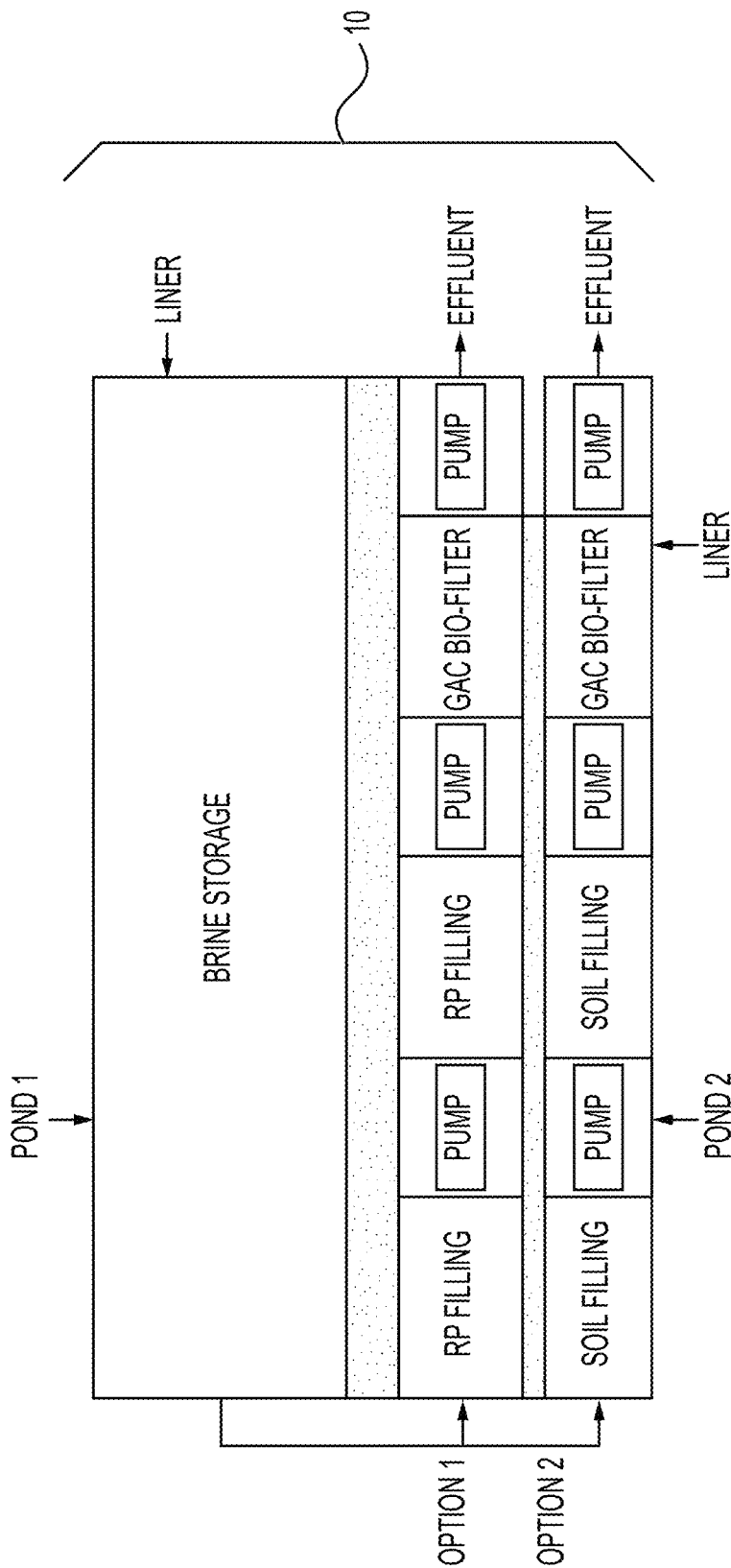
FIG. 6 shows an embodiment of an automated wetland treatment system for treatment of wastewater according to the present teachings.

Referring to FIG. 6, the system 10 can be fully automated. In an embodiment, the system can be operated with a control panel programmer pump. In one embodiment, the system 10 can be configured to treat about 0.6 m$^3$/day. The system 10 can have three submersible pumps (about 100 l/min) placed in a storage pond, and six feeding pumps (about 192 l/min). In an embodiment, each system can have three feeding pumps. Water flow meters can be placed after each pump to identify the quantity of water treated. An electricity meter can be installed in the control panel to identify the electrical (energy) consumption of the operating system.

The system can be operated using a tidal flow strategy, a process that repeatedly allows CWs to be filled with wastewater such that the main media layer is submerged with the wastewater and then fully drained by the pumps. In other words, the wastewater is pumped into the CW, contacted with the main media layer, and then drained. The tidal flow strategy can enhance oxygen transfer for microbial activities.

The following examples illustrate the present teachings.

EXAMPLES

Example 1

System Assembly and Operation

Figure 2:
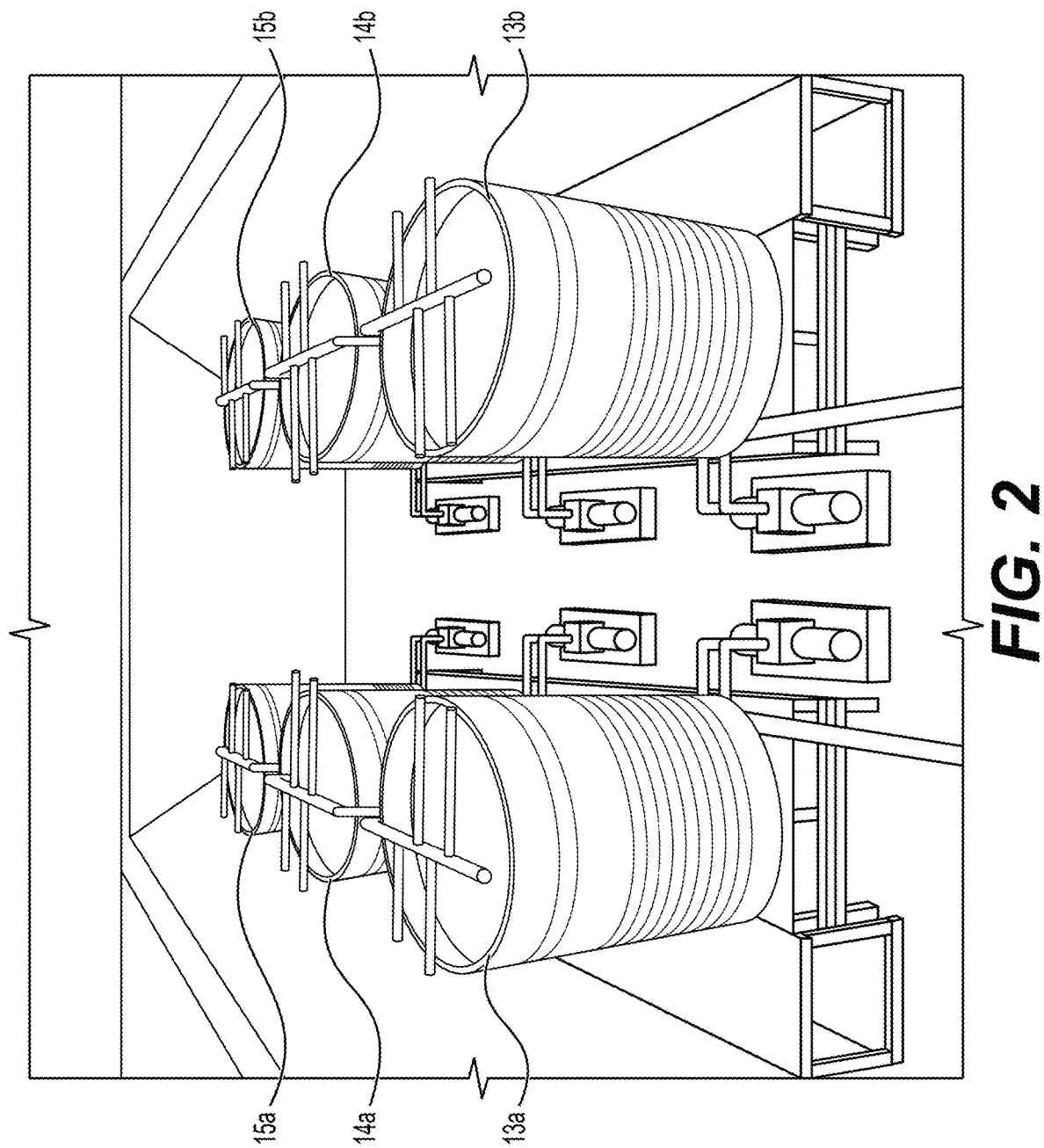
FIG. 2 shows an embodiment of a traditional wastewater treatment system and the wastewater treatment system of the present teachings assembled alongside the traditional wastewater treatment system.

Two wastewater treatment systems were assembled, as shown in FIG. 2. The first was a traditional wastewater treatment system. The second was the wastewater treatment system of the present teachings. The first system was a traditional wastewater treatment system, including two vertical flow constructed wetlands (CWs) 13*a*, 14*a* and a granular activated carbon biofilter 15*a* connected in series, as described herein. The second system was the wastewater treatment system of the present teachings including two vertical flow constructed wetlands (CWs) 13*b*, 14*b* and a granular activated carbon biofilter 15*b* connected in series, as described herein. Both systems were identical except that the traditional wastewater treatment system included soil in the main layer of each CW and agricultural sand in the distribution layer of each CW while the wastewater treatment system of the present teachings included plastic in the main layer of each CW and both sand and agricultural sand in the distribution layer of each CW. Each system included a granular activated carbon (GAC) biofilter connected in series to a respective CW. The height of the container housing the granular activated carbon (GAC) biofilter was about 1 meter. The height of the granular activated carbon (GAC) biofilter was about 50 cm. The size of the granular activated carbon (GAC) biofilter was about 2.5 mm. Each system was configured to treat about 0.6 m$^3$/day, e.g., about 1.2 m$^3$/day.

All of the CWs were designed with 1 m height, 1.2 m$^2$ surface area, and a circular shape. Each CW had three layers including a drainage layer, a main filter layer, and a distribution layer. For the drainage layer, both systems included gravel media having a height of 25 cm (the first 5 cm having a size of 8-16 mm and the second 20 cm having a size of 2-5 mm), a main filter layer having a height of 50 cm (for soil media; size 0.3-0.6 mm), and a distribution layer in which plants were grown to a height of about 10 cm. For the traditional system, the distribution layer included an agricultural sand layer with a height of 10 cm. For the system of the present teachings, the distribution layer included a sand layer having a height of 5 cm (size 0.3-0.6 mm) and an agricultural sand layer having a height of 5 cm.

The CWs were followed by a GAC biofilter having a height of 50 cm, size 2.5 mm for both systems. The main aim of the GAC biofilter in the system was to further polish the treated reverse osmosis (RO) reject wastewater after the CW from metals, nitrogen compounds, and trace organics.

Both systems were fully automated, operating with a control panel programmer pump, as shown in FIG. 6. Each system treated 0.6 m$^3$/day (1.2 m$^3$/day for both systems) of wastewater. The system had three submersible pumps (100 l/min) placed in the storage pond and six feeding pumps (192 l/min). Each system had three feeding pumps. Water flow meters were placed after each pump to identify the quantity of the water, and an electricity meter was installed in the control panel to identify the electrical (energy) consumption of the operating system at the end of the project. The RO reject wastewater (brine wastewater) was stored in a pond 15*8*1.2 m (length*width, height) and introduced to both systems (soil) and (plastic).

The two CW systems were constructed at Sulaibiya Research Plant SRP. The wetland systems were designed to operate in three cycles per day, and each cycle lasted up to eight hours (three hours in the first two vertical CWs and two hours in the GAC biofilter). The first two vertical CWs in each system were planted with *Sesuvium*. *Sesuvium* (considered to be a salinity tolerant plant). The brine wastewater was introduced to both the traditional wastewater treatment system and the present wastewater treatment system and maintained in the first CW of the respective system for 3 hours. After that, the automatic pumps pumped the treated brine wastewater from the first CW of each system to the second CW of each system, respectively for 3 hours. Then, the automatic pumps pumped the treated brine wastewater from the second CW of the respective system to the GAC biofilter for 2 hours for further removing metals, nitrogen compounds, and trace organics from the treated brine wastewater received from the CWs. This resulted in 8 hours per cycle (three cycles a day). The tidal flow strategy was used in the systems to enhance oxygen transfer for microbial activities.

The tidal flow strategy repeatedly allowed the CWs to be filled with wastewater so the main media layer can be submerged and then fully drained by the pumps, which means that the process was operated in a filling, contact, drain, and rest sequence.

Example 2

Results

The present system exhibited superior removal efficiency compared to the traditional system in total organic carbon (TOC) removal. Additionally, the present system operated without encountering clogging issues, whereas the traditional system faced clogging problems 32 times. As such, the present system demonstrated not only better performance but also contributed to reduced electricity (energy) consumption. Likewise, in the case of nutrients, the present system excelled in removal performance efficiency. This superiority can be attributed to the high oxygen supply facilitated by the utilization of tidal flow and the high porosity of the organic plastic random packing media employed in the system. Additionally, concerning the removal of heavy metals and other contaminants, the effectiveness was attributed to microbial activities and the uptake by plants in both systems. The results of the removal performance efficiency are provided below.

Total Organic Carbon (TOC): In the first constructed wetland of the traditional and present systems, the traditional system outperformed the present system in 35 out of 51 weeks. In the second constructed wetland of the traditional and present systems, the present system outperformed the traditional system in 29 out of 51 weeks. In the granular activated carbon (GAC) biofilter of the traditional and present systems, the present system outperformed the traditional system in 26 out of 51 weeks. In overall performance removal efficiency, from influent to final effluent, the traditional system outperformed the present system in 37 out of 51 weeks.

Total Suspended Solids (TSS): In the first constructed wetland of the traditional and present systems, the traditional system outperformed the present system in 44 out of 51 weeks. In the second constructed wetland of the traditional and present systems, the present system outperformed the traditional system in 27 out of 51 weeks. In the granular activated carbon (GAC) biofilter of the traditional and the present systems, the present system outperformed the traditional system in 37 out of 51 weeks. In overall performance removal efficiency, from influent to final effluent, the traditional system outperformed the present system in 38 out of 51 weeks.

Total Dissolved Solids (TDS): In the first constructed wetland of the traditional and present systems, the traditional system outperformed the present system in 30 out of 51 weeks. In the second constructed wetland of the traditional and present systems, the present system outperformed the traditional system in 26 out of 51 weeks. In the granular activated carbon (GAC) biofilter of the traditional and present systems, the present system outperformed the traditional system in 37 out of 51 weeks. In overall performance removal efficiency, from influent to final effluent, the traditional system outperformed the present system in 31 out of 51 weeks.

Volatile Suspended Solids (VSS): In the first constructed wetland of the traditional and present systems, the traditional system outperformed the present system in 47 out of 51 weeks. In the second constructed wetland of the traditional and present systems, the traditional system outperformed the present system in 26 out of 51 weeks. In the granular activated carbon (GAC) biofilter of the traditional and present systems, the present system outperformed the traditional system in 35 out of 51 weeks. In overall performance removal efficiency, from influent to final effluent, the traditional system outperformed the present system in 38 out of 51 weeks.

Total Phosphorous (TP): In the first constructed wetland of the traditional and present systems, the traditional system outperformed the present system in 35 out of 51 weeks. In the second constructed wetland of the traditional and present systems, the present system outperformed the traditional system in 35 out of 51 weeks. In the granular activated carbon (GAC) biofilter of the traditional and present systems, the traditional system outperformed the present system in 29 out of 51 weeks. In overall performance removal efficiency, from influent to final effluent, the present system outperformed the traditional system in 32 out of 51 weeks.

Ammonia (NH3); In the first constructed wetland of the traditional and present systems, the present system outperformed the traditional system in 29 out of 51 weeks. In the second constructed wetland of the traditional and present systems, the present system outperformed the traditional system in 29 out of 51 weeks. In the granular activated carbon (GAC) biofilter of the traditional and present systems, the present system outperformed the traditional system in 32 out of 51 weeks. In overall performance removal efficiency, from influent to final effluent, the present system outperformed the traditional system in 35 out of 51 weeks.

Total Nitrogen (TN): In the first constructed wetland of the traditional and present systems, the present system outperformed the traditional system in 38 out of 51 weeks. In the second constructed wetland of the traditional and present systems, the present system outperformed the traditional system in 27 out of 51 weeks. In the granular activated carbon (GAC) biofilter of the traditional and present systems, the traditional system outperformed the present system in 33 out of 51 weeks. In overall performance removal efficiency, from influent to final effluent, the present system outperformed the traditional system in 35 out of 51 weeks.

Phenol: In the first constructed wetland of the traditional and present systems, the present system outperformed the traditional system in 39 out of 51 weeks. In the second constructed wetland of the traditional and present systems, the present system outperformed the traditional system in 29 out of 51 weeks. In the granular activated carbon (GAC) biofilter of the traditional and present systems, the present system outperformed the traditional system in 33 out of 51 weeks. In overall performance removal efficiency, from influent to final effluent, the present system outperformed the traditional system in 43 out of 51 weeks.

Fluoride (F—): In the first constructed wetland of the traditional and present systems, the present system outperformed the traditional system in 26 out of 51 weeks. In the second constructed wetland of the traditional and present systems, the present system outperformed the traditional system in 26 out of 51 weeks. In the granular activated carbon (GAC) biofilter of the traditional and present systems, the traditional system outperformed the present system in 35 out of 51 weeks. In overall performance removal efficiency, from influent to final effluent, the traditional system outperformed the present system in 33 out of 51 weeks.

Sulfide (S2): In the first constructed wetland of the traditional and present systems, overall performance removal efficiency was similar for both systems.

Chloride (Cl—): In the first constructed wetland of the traditional and present systems, the traditional system outperformed the present system in 26 out of 51 weeks. In the second constructed wetland of the traditional and present systems, the traditional system outperformed the present system in 27 out of 51 weeks. In the granular activated carbon (GAC} biofilter of the traditional and present systems, the traditional system outperformed the present system in 28 out of 51 weeks. In overall performance removal efficiency, from influent to final effluent, the traditional system outperformed the present system in 34 out of 51 weeks.

Sulfate (Sol·): In the first constructed wetland of the traditional and present systems, the present system outperformed the traditional system in 31 out of 51 weeks. In the second constructed wetland of the traditional and present systems, the traditional system outperformed the present system in 32 out of 51 weeks. In the granular activated carbon (GAC} biofilter of the traditional and present systems, the present system outperformed the traditional system in 26 out of 51 weeks. In overall performance removal efficiency, from influent to final effluent, the traditional system outperformed the present system in 31 out of 51 weeks.

Sodium (Na): In the first constructed wetland of the traditional and present systems, the traditional system outperformed the present system in 27 out of 51 weeks. In the second constructed wetland of the traditional and present systems, the present system outperformed the traditional system in 27 out of 51 weeks. In the granular activated carbon (GAC) biofilter of the traditional and present systems, the traditional system outperformed the present system in 29 out of 51 weeks. In overall performance removal efficiency, from influent to final effluent, the traditional system outperformed the present system in 28 out of 51 weeks.

Total Oil & Grease (TOG): In the first constructed wetland of the traditional and present systems, overall performance removal efficiency was similar.

Cadmium (Cd): In the first constructed wetland of the traditional and present systems, the present system outperformed the traditional system in 32 out of 51 weeks. In the second constructed wetland of the traditional and present systems, the present system outperformed the traditional system in 30 out of 51 weeks. In the granular activated carbon (GAC) biofilter of the traditional and present systems, the traditional system outperformed the present system in 29 out of 51 weeks. In overall performance removal efficiency, from influent to final effluent, the present system outperformed the traditional system in 31 out of 51 weeks.

Chromium (Cr): In the first constructed wetland of the traditional and present systems, the traditional system outperformed the present system in 38 out of 51 weeks. In the second constructed wetland of the traditional and present systems, the present system outperformed the traditional system in 34 out of 51 weeks. In the granular activated carbon (GAC) biofilter of the traditional and present systems, the traditional system and the present system performed similar to each other in 26 out of 51 weeks. In overall performance removal efficiency, from influent to final effluent, the present system outperformed the traditional system in 27 out of 51 weeks.

Nickel (Ni): In the first constructed wetland of the traditional and present systems, the present system outperformed the traditional system in 28 out of 51 weeks. In the second constructed wetland of the traditional and present systems, the traditional system outperformed the present system in 33 out of 51 weeks. In the granular activated carbon (GAC) biofilter of the traditional and present systems, the present system outperformed the traditional system in 26 out of 51 weeks. In overall performance removal efficiency, from influent to final effluent, the traditional system outperformed the present system in 37 out of 51 weeks.

Mercury (Hg): In the first constructed wetland of the traditional and present systems, the present system outperformed the traditional system in 38 out of 51 weeks. In the second constructed wetland of the traditional and present systems, the present system outperformed the traditional system in 36 out of 51 weeks. In the granular activated carbon (GAC) biofilter of the traditional and present systems, the traditional system outperformed the present system in 32 out of 51 weeks. In overall performance removal efficiency, from influent to final effluent, the present system outperformed the traditional system in 39 out of 51 weeks.

Cobalt (Co): In the first constructed wetland of the traditional and present systems, the traditional system outperformed the present system in 27 out of 51 weeks. In the second constructed wetland of the traditional and present systems, traditional system outperformed the present system in 34 out of 51 weeks. In the granular activated carbon {GAC) biofilter of the traditional and present systems, the present system outperformed the traditional system in 33 out of 51 weeks. In overall performance removal efficiency, from influent to final effluent, the present system outperformed the traditional system in 30 out of 51 weeks.

Iron (Fe): In the first constructed wetland of the traditional and present systems, the traditional system outperformed the present system in 29 out of 51 weeks. In the second constructed wetland of the traditional and present systems, the traditional system outperformed the present system in 29 out of 51 weeks. In the granular activated carbon (GAC) biofilter of the traditional and present systems, the present system outperformed the traditional system in 27 out of 51 weeks. In overall performance removal efficiency, from influent to final effluent, the traditional system outperformed the present system in 37 out of 51 weeks.

Antimony (Sb): In the first constructed wetland of the traditional and present systems, the traditional system outperformed the present system in 36 out of 51 weeks. In the second constructed wetland of the traditional and present systems, B1 and B2, respectively, the present system outperformed the traditional system in 37 out of 51 weeks. In the granular activated carbon (GAC) biofilter of the traditional and present systems, the present system outperformed the traditional system in 32 out of 51 weeks. In overall performance removal efficiency, from influent to final effluent, the present system outperformed the traditional system in 45 out of 51 weeks.

Copper (Cu): In the first constructed wetland of the traditional and present systems, the traditional system outperformed the present system in 29 out of 51 weeks. In the second constructed wetland of the traditional and present systems, the traditional system outperformed the present system in 27 out of 51 weeks. In the granular activated carbon (GAC) biofilter of the traditional and present systems, the present system outperformed the traditional system in 27 out of 51 weeks. In overall performance removal efficiency, from influent to final effluent, the traditional system outperformed the present system in 27 out of 51 weeks.

Manganese (Mn): In the first constructed wetland of the traditional and present systems, the traditional system outperformed the present system in 30 out of 51 weeks. In the second constructed wetland of the traditional and present systems, the traditional system outperformed the present system in 38 out of 51 weeks. In the granular activated carbon (GAC) biofilter of the traditional and present systems, the present system outperformed the traditional system in 37 out of 51 weeks. In overall performance removal efficiency, from influent to final effluent, the traditional system outperformed the present system in 28 out of 51 weeks.

Zinc (Zn): In the first constructed wetland of the traditional and present systems, the traditional system outperformed the present system in 26 out of 51 weeks. In the second constructed wetland of the traditional and present systems, the present system outperformed the traditional system in 26 out of 51 weeks. In the granular activated carbon (GAC) biofilter of the traditional and present systems, the traditional system outperformed the present system in 33 out of 51 weeks. In overall performance removal efficiency, from influent to final effluent (C1 and C2), the traditional system outperformed the Present system in 40 out of 51 weeks.

Lead (Pb): In the first constructed wetland of the traditional and present systems, the present system outperformed the traditional system in 35 out of 51 weeks. In the second constructed wetland of the traditional and present systems, the traditional system outperformed the present system in 32 out of 51 weeks. In the granular activated carbon (GAC) biofilter of the traditional and present systems, the traditional system outperformed the present system in 32 out of 51 weeks. In overall performance removal efficiency, from influent to final effluent, the traditional system outperformed the present system in 36 out of 51 weeks.

Boron (B): In the first constructed wetland of the traditional and present systems, the traditional system outperformed the present system in 33 out of 51 weeks. In the second constructed wetland of the traditional and present systems, the present system outperformed the traditional system in 27 out of 51 weeks. In the granular activated carbon (GAC) biofilter of the traditional and present systems, the present system outperformed the traditional system in 34 out of 51 weeks. In overall performance removal efficiency, from influent to final effluent, the present system outperformed the traditional system in 31 out of 51 weeks.

Barium (Ba): In the first constructed wetland of the traditional and present systems, the traditional system outperformed the present system in 31 out of 51 weeks. In the second constructed wetland of the traditional and present systems, the present system outperformed the traditional system in 28 out of 51 weeks. In the granular activated carbon (GAC) biofilter of the traditional and present systems, the traditional system outperformed the present system in 26 out of 51 weeks. In overall performance removal efficiency, from influent to final effluent, the present system outperformed the traditional system in 33 out of 51 weeks.

Arsenic (As): In the first constructed wetland of the traditional and present systems, the traditional system outperformed the present system in 33 out of 51 weeks. In the second constructed wetland of the traditional and present systems, the present system outperformed the traditional system in 31 out of 51 weeks. In the granular activated carbon (GAC) biofilter of the traditional and present systems, the traditional system outperformed the present system in 31 out of 51 weeks. In overall performance removal efficiency, from influent to final effluent, the traditional system outperformed the present system in 32 out of 51 weeks.

Aluminum (Al): In the first constructed wetland of the traditional and present systems, the traditional system outperformed the present system in 38 out of 51 weeks. In the second constructed wetland of the traditional and present systems, the present system outperformed the traditional system in 33 out of 51 weeks. In the granular activated carbon (GAC) biofilter of the traditional and present systems, the present system outperformed the traditional system in 27 out of 51 weeks. In overall performance removal efficiency, from influent to final effluent, the present system outperformed the traditional system in 28 out of 51 weeks.

Potential ancillary patent: Based on the results of BOD and COD removal, a new system composed on a first conventional wetland, second plastic substrate packed wetland, and a carbon biofilter could add an improvement on performance. This is due to better removal of COD and BOD in the first wetland which could enhance overall removal and improve shock loads handling by the system.

Biochemical Oxygen Demand (BOD): In the first constructed wetland of the traditional and present systems, the traditional system outperformed the present system in 51 out of 62 weeks. In the second constructed wetland of the traditional and present systems, the present system outperformed the traditional system in 47 out of 62 weeks. In the granular activated carbon (GAC) biofilter of the traditional and present systems, the present system outperformed the traditional system in 35 out of 62 weeks. In overall performance removal efficiency, from influent to final effluent, the traditional system outperformed the present system in 44 out of 62 weeks.

Chemical Oxygen Demand (COD): In the first constructed wetland of the traditional and present systems, the traditional system outperformed the present system in 51 out of 62 weeks. In the second constructed wetland of the traditional and present systems, the present system outperformed the traditional system in 45 out of 62 weeks. In the granular activated carbon (GAC) biofilter of the traditional and present systems, the present system outperformed the traditional system in 33 out of 62 weeks. In overall performance removal efficiency, from influent to final effluent, the traditional system outperformed the present system in 41 out of 62 weeks.

Electrical consumption: Tables 1 and 2 present the recorded values of the quantities of RO reject wastewater and treated RO reject wastewater that were utilized, along with the corresponding electrical consumption of each pump employed. In Table 1, it is noteworthy that the flow meter readings for 13A, 14A, and 15A were higher than the inflow of Brine IN from the RO reject wastewater pond. This was a result of system clogging, which required the feeding pumps to be manually operated for a longer duration to facilitate the transfer of RO reject wastewater throughout the system. Consequently, instead of drawing in the wastewater, the pumps ended up suctioning air, resulting in the flow meter recording higher readings. The RO reject wastewater was predominantly suspended in the first CWs. Consequently, this led to an increase in electricity consumption.

Table 2, in terms of flow meters for Brine IN, system No. 2 exhibited significantly higher readings compared to system No. 1. This difference can be attributed to the lower resistance present in system No. 2 when compared to system No. 1. As a result, the electricity consumption in system No. 2 was lower.

TABLE 1

Flow and Electrical Meters Readings for System No. 1 (Traditional System)

| Stages | Brine IN | S1A | S1B | S1C |
|---|---|---|---|---|
| Flow meters (m³) | 146 | 164 | 161 | 160 |
| Electrical meter (KW) | 33.6 | 44.3 | 41.1 | 48.7 |

TABLE 2

Flow and Electrical Meters Readings for System No. 2

| Stages | Brine IN | S2A | S28 | S2C |
|---|---|---|---|---|
| Flow meters (m³) | 153 | 151 | 150 | 146 |
| Electrical meter (KW) | 33.6 | 42.7 | 38.6 | 48.2 |

It is to be understood that the wetland system for treatment of wastewater is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A wetland system for treatment of reverse osmosis (RO) reject wastewater, the system comprising:
   first and second vertical constructed wetlands directly connected in series, the first and second vertical constructed wetlands each including a bottom drainage layer, a main filter layer above the drainage layer, and a distribution layer above the main filter layer, the distribution layer comprising a salinity tolerant plant; and
   a granular activated carbon biofilter connected directly to the second vertical constructed wetland; wherein
   the bottom drainage layer of both the first and second vertical constructed wetlands comprises gravel having a first size and a second size different from the first size,
   the distribution layer of both the first and second vertical constructed wetlands comprises agricultural sand,
   the main filter layer of the first and second vertical constructed wetlands comprises a bio-plastic media.

2. The system of claim 1, wherein the granular activated carbon (GAC) biofilter has a height of about 50 cm with a size of 2.5 mm.

3. The system of claim 1, wherein each of the vertical flow constructed wetlands is about 1 meter in height and has a surface area of about 1.2 m².

4. The system of claim 3, wherein a height of the drainage layer is about 25 cm, a height of the main filter layer is about 50 cm, and a height of the distribution layer is about 10 cm.

5. The system of claim 4, wherein a first portion of the drainage layer has a height of about 5 cm and comprises gravel having the first size, and a second portion of the drainage layer has a height of about 20 cm and comprises gravel having the second size.

6. The system of claim 5, wherein the first size ranges from about 8 mm to about 16 mm and the second gravel size ranges from about 2 mm to about 5 mm.

7. The system of claim 1, further comprising:
   a storage pond for storing the wastewater;
   a plurality of submersible pumps in the storage pond; and
   a plurality of feeding pumps extending between the submersible pumps and the vertical flow constructed wetlands.

8. A wetland system for treatment of reverse osmosis (RO) reject wastewater, the system comprising:
   first and second vertical constructed wetlands directly connected in series, the first and second vertical constructed wetlands each including a bottom drainage layer, a main filter layer above the drainage layer, and a distribution layer above the main filter layer comprising a salinity tolerant plant; and
   a granular activated carbon biofilter connected directly to the second vertical constructed wetland, wherein
   the bottom drainage layer of both the first and second vertical constructed wetlands comprises gravel having a first size and a second size different from the first size,
   the distribution layer of both the first and second vertical constructed wetlands comprises agricultural sand, and
   the main filter layer of the first and second vertical constructed wetlands comprise a bio-plastic media.

9. The system of claim 8, wherein each of the vertical flow constructed wetlands is about 1 meter in height and has a surface area of about 1.2 m².

10. The system of claim 9, wherein a height of the drainage layer is about 25 cm, a height of the main filter layer is about 50 cm, and a height of the distribution layer is about 10 cm.

11. The system of claim 10, wherein a first portion of the drainage layer has a height of about 5 cm and comprises gravel of a first size, and a second portion of the drainage layer has a height of about 20 cm and comprises gravel of a second size.

12. The system of claim 11, wherein the first size ranges from about 8 mm to about 16 mm and the second gravel size ranges from about 2 mm to about 5 mm.

13. The system of claim 8, the granular activated carbon (GAC) biofilter has a height of about 50 cm with size of 2.5 mm.

14. The system of claim 13, wherein the plant comprises *Sesuvium*.

* * * * *